United States Patent Office 2,944,886
Patented July 12, 1960

2,944,886

REDUCTION OF SILVER LOSS IN BURNING PHOTOGRAPHIC WASTE

Webster E. Fisher and John E. O'Brian, Rochester, N.Y., assignors to Eastman Kodak Company, Rochester, N.Y., a corporation of New Jersey No Drawing. Filed Aug. 21, 1958, Ser. No. 756,287

4 Claims. (Cl. 75—83)

This invention concerns the recovery of silver from waste photographic materials such as film, paper and paper filters used for filtering photographic emulsions.

In order to recover silver from photographic waste products such as film, paper, and the like, these materials have very often been treated with hypo which is a solution of sodium thiosulfate in order to obtain the silver salt in solution. The silver is later recovered from the hypo solution by chemical means. In many cases the amount of silver which is present on the film or paper support is insufficient to warrant the hypo recovery method even though in many cases the paper or support itself can be recovered using this process. We have found a process of recovering the silver from these waste products which is relatively inexpensive and we have also found a way of improving the process so that production rates are increased and efficiency improved. This process involves burning the waste products under controlled conditions and recovering the silver from the ash.

One object of this invention is to provide a process for recovering silver from waste photographic materials such as film, paper and the like by burning these materials with a low loss of silver in the flue gases. Another object of this invention is to provide a process for burning photographic waste materials such as film, paper and the like at an approximately 50 percent greater rate than by allowing combustion to proceed at a natural burning rate.

The above objects are obtained by burning waste products and recovering the ash which is then smelted using a chemical flux to reduce the silver salts to silver metal and to remove the undesired impurities as slag. We have also found that when the combustion is allowed to proceed using normal burning conditions at atmospheric pressure and natural flue draft, that the temperature of the combustion bed reaches such a high temperature that considerable silver is lost by volatilization of the silver halide salts such as silver chloride, silver bromide and the like.

We have found that by adding water to the photographic waste in the form of spray, mist, steam or prewetted paper that surprisingly an improved yield of silver is obtained. Moreover, the burning rate of the paper can be increased as much as 50 percent greater than when the fire is permitted to burn naturally without the use of the additional water. If only the burning rate is controlled without the addition of moisture, as much as 10 to 20 percent of the silver is lost in smoke.

The following examples are intended to illustrate our invention but are not intended to limit it in any way:

*Example 1*

9,600 pounds of waste photographic paper containing about 960 troy ounces of silver was burned in 8 hours over a grate in an enclosed incinerator, the rate of burning being controlled to keep the gases in the exit flue at about 650° F. and an average incandescent bed temperature of about 1400° F. computed by taking five readings and averaging. The measurement of the quantity and silver content of the stack gases showed a loss of about 175 troy ounces of silver, or a loss of 18.2 percent.

The same operation was carried out as described above except that four solid-cone spray nozzles carrying a total of 80 gallons of water per hour sprayed approximately uniformly over the burning area. It was possible to burn 14,500 pounds of paper in 8 hours while maintaining the flue temperature at about 650° F. and an average bed temperature of 1400° F. obtained by taking five different readings. Loss measurement showed a silver loss in the stack gases of about 70 troy ounces, or a loss of 4.8 percent.

*Example 2*

14,000 pounds of waste photographic paper was burned in 14 hours without using a spray but by controlling the rate of combustion so that the flue gas temperature measured in the settling chamber immediately adjacent to the combustion chamber was maintained at 600–700° F. and the bed temperature was maintained at about 1400° F. obtained by taking an average of five readings using a pyrometer.

17,500 pounds of paper were burned as above in the same incinerator in 14 hours using water sprays which substantially uniformly distributed water over the combustion area in an amount of 1840 gallons during the 14-hour period. The rate of combustion was increased 25 percent over combustion without using the spray and the silver loss in the flue gases was reduced 20 percent based on flue gas analysis. The temperature of the flue gas measured in the combustion chamber as above was maintained at 600–700° F.; the average incandescent bed temperature measured as above was 1400° F.

The amount of water which is added to the combustion ranges from 25 to 150 percent by weight based on the dry waste material. This water may be added using a direct spray which is uniformly distributed over the combustion area or may be added using steam, saturated wet paper or the like. However, the incandescent bed temperature should be maintained at an average temperature of 1200–1600° F. This temperature is obtained by taking an average of several readings using a pyrometer which measures the temperature of the incandescent bed.

After the waste photographic material has been burned, the resulting ash contains relatively little carbonaceous material. The ash consists preponderantly of barium sulfate, some barium sulfide, lesser amounts of other inorganic salts, and silver which may be present as metal, halide or sulfide. Various fluxes may be added to reduce the silver salts to metal. For instance, in our preferred embodiment, we use soda ash, borax and iron oxide or iron. Other fluxes which may be used are: sodium carbonate, silica and borax; carbonate of potash and iron filings; carbonate of potash, iron and borax; and the like.

Although we have found that the temperature of the incandescent combustion bed is a critical factor in burning photographic waste without excess loss of the silver contained therein, we have also determined that in our preferred embodiment from 30 to 200 gallons per 1000 pounds of waste material is used in order to maintain the temperature of the incandescent bed within the desired temperature limits. Of necessity, the temperature of burning waste products must be above the ignition temperature of the waste material. At this low temperature slightly above the ignition temperature, the loss of silver is at the lowest point. However, it is impractical to carry on the combustion at such a low temperature especially if moisture is added inasmuch as the addition of cold water to a combustion having such a low temperature would cause the temperature to decrease and the fire to go out. Therefore, a temperature must be found at which combustion will be maintained and yet at which the silver loss is kept at its minimum.

The loss of silver from volatilization during the burning of waste photographic materials is a critical factor which must be considered. The addition of water to the combustion results in a lowered temperature of the incandescent bed, but the reduction in the volatilization loss cannot be explained purely on the basis of evaporation of the water vapor. One explanation of what happens when water is added to the combustion of photographic waste products is that a water gas reaction takes place in which about 25 percent of the carbon reacts with water to form carbon monoxide and hydrogen gas by an endothermic reaction. This theory is further supported by the fact that the stack gases were at the same temperature as illustrated by the examples while the temperature of the incandescent bed, when using water sprays, must be considerably lower, since the exothermic reaction of the resulting hydrogen and carbon monoxide with oxygen takes place only between the bed and the point of temperature measurement.

We claim:

1. A process of recovering silver by burning waste photographic materials containing silver comprising adding water as a spray to the combustion sufficient to maintain the incandescent bed of the combustion at an average temperature of 1200–1600° F.

2. A process of recovering silver from burning waste photographic materials containing silver comprising adding 30–200 gallons of water as a spray for every 1,000 pounds of waste material based on the dry waste material to the combustion sufficient to maintain the incandescent bed of the combustion at a temperature of 1200–1600° F.

3. A process of recovering silver by burning waste photographic materials containing silver comprising adding water as a spray to the combustion sufficient to maintain the incandescent bed of the combustion at an average temperature of 1200–1600° F. to remove the carbonaceous material, smelting the resulting ash with a reducing flux, and recovering silver metal.

4. A process of recovering silver from burning waste photographic materials containing silver comprising adding 30–200 gallons of water as a spray for every 1,000 pounds of waste material based on the dry waste material to the combustion sufficient to maintain the incandescent bed of the combustion at a temperature of 1200–1600° F. to remove the carbonaceous material, smelting the resulting ash with a reducing flux, and recovering silver metal.

References Cited in the file of this patent

UNITED STATES PATENTS

| | | |
|---|---|---|
| 2,131,072 | Reid | Sept. 27, 1938 |
| 2,218,250 | Reid | Oct. 15, 1940 |
| 2,778,018 | Strassburger | Jan. 15, 1957 |
| 2,855,293 | Savard et al. | Oct. 7, 1958 |